Jan. 27, 1970  O. L. LINSALATO  3,491,783
DISCHARGE VALVE
Filed Sept. 11, 1967  2 Sheets-Sheet 1

INVENTOR.
ORONZO L. LINSALATO
BY Fulwider, Patton, Rieber,
Lee and Utecht
ATTORNEYS Jan. 27, 1970   O. L. LINSALATO   3,491,783
DISCHARGE VALVE Filed Sept. 11, 1967   2 Sheets-Sheet 2

INVENTOR.
ORONZO L. LINSALATO

BY *Fulwider, Patton, Rieber,*
*Lee and Utecht*
ATTORNEYS

United States Patent Office 3,491,783
Patented Jan. 27, 1970

3,491,783
DISCHARGE VALVE
Oronzo L. Linsalato, San Marino, Calif., assignor to Accessory Products Co., Whittier, Calif., a Division of Textron, Inc., a corporation of Rhode Island
Filed Sept. 11, 1967, Ser. No. 666,580
Int. Cl. A62c 23/00, 37/30; F16k 31/02
U.S. Cl. 137—68                    2 Claims

ABSTRACT OF THE DISCLOSURE

A discharge valve including a housing formed with a passage, one end of which passage defines an inlet and the other end of which defines an outlet. A diaphragm normally blocks the passage and means are provided for cutting a hole therein. A relief and filler port is disposed on the inlet side of the diaphragm and extends laterally from the passage. The port is generally of a relatively large diameter but is reduced in diameter adjacent the passage, the reduction in diameter forming a valve seat. A plug is screwed into the port and its axially inner end is formed to abut the valve seat. The plug includes a relief passage which has its inner end confronting the orifice defined by the valve seat when the plug is screwed against such seat. The plug also includes a filler passage which has its inner end disposed laterally from the orifice whereby flow out the orifice and through the filler passage is blocked when the inner end of the plug is seated on the valve seat. A meltable insert normally plugs the relief passage but melts at a predetermined temperature to allow fluid to escape out the relief passage.

BACKGROUND OF THE INVENTION

Field of the invention

The present invention relates generally to discharge valves and more particularly to discharge valves which provide pressure relief at a predetermined temperature.

Description of the prior art

There are no discharge valves known to applicant which provide for automatically releasing the fluid contained in the container, to which the valve is attached, when the environment reaches a predetermined temperature.

SUMMARY OF THE INVENTION

The discharge valve of present invention includes a diaphragm normally blocking the flow passage and means for selectively cutting a discharge hole in the diaphragm. A filler port is disposed on the inlet side of the diaphragm and forms an outwardly-facing valve seat. A plug is screwed into the port and has its inner end shaped to abut the valve seat to prevent fluid flow out the orifice defined by such seat. The plug includes a relief passage having its inner end confronting the orifice and a filler passage having its inner end disposed laterally from the orifice. A meltable insert normally plugs the relief passage and melts at a predetermined temperature to open the relief passage for fluid discharge.

Other objects and features of the invention will become apparent from consideration of the following description taken in connection with the accompanying drawings.

DESCRIPTION OF THE PREFERRED EMBODIMENTS

Figure 1:
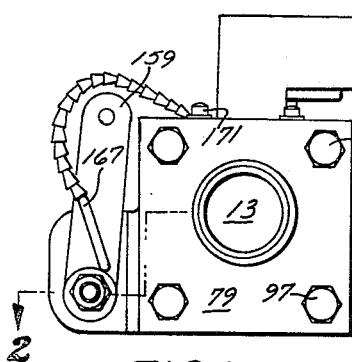
FIG. 1 is a top view of a discharge valve embodying the present invention.
Figure 3:
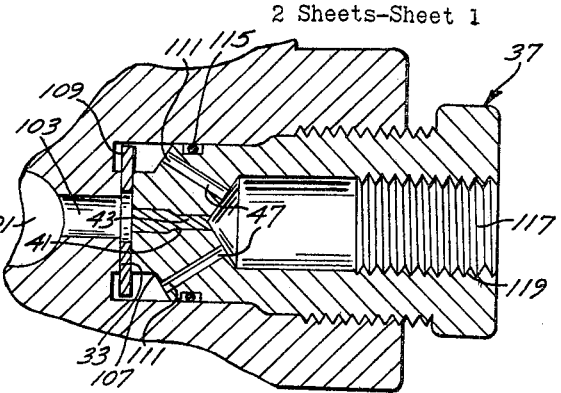
FIG. 3 is a partial horizontal sectional view, in enlarged scale, taken along the line 3—3 of FIG. 2.
Figure 2:
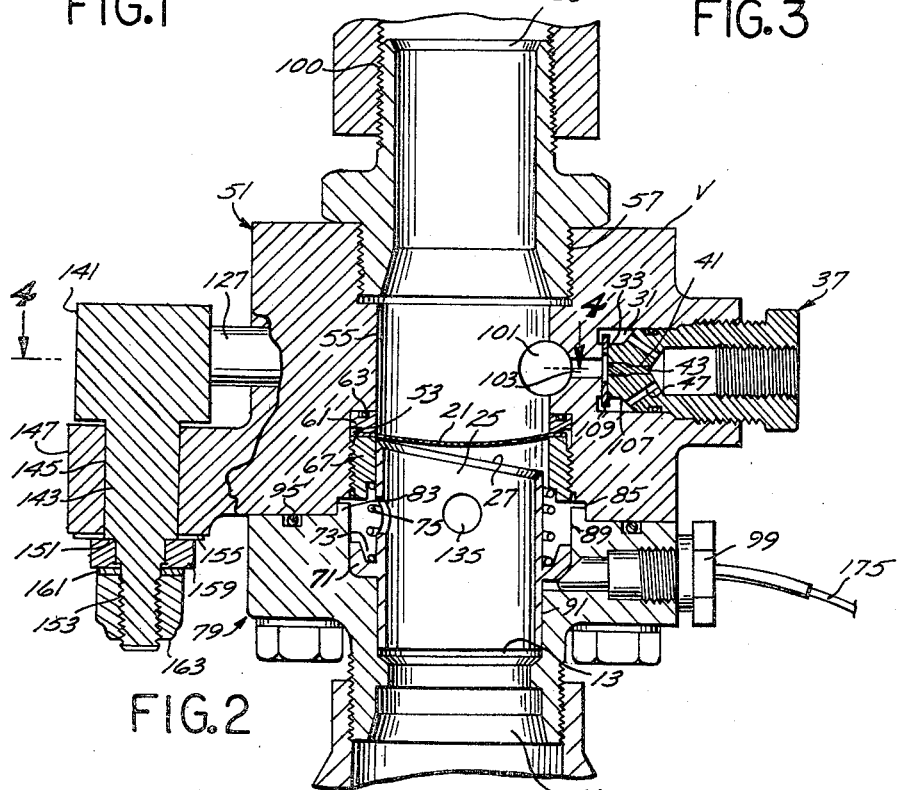
FIG. 2 is a vertical sectional view, in enlarged scale, taken along the line 2—2 of FIG. 1.

Referring to FIGS. 1 and 2, the discharge valve V of present invention includes a passage 13 which has an inlet 13a on its upper end and an outlet 13b on its lower end. A relatively thin diaphragm 21 normally blocks the passage 13 and a hollow cylindrical slider 25 is disposed under the diaphragm and forms a circular shaped cutting edge 27 for cutting a discharge hole in the diaphragm upon upward movement in the passage 13. Referring to FIG. 3, a filler and relief port 31 is formed in the right-hand wall of the valve housing and is shaped to define an outwardly-facing valve seat 33. A filler plug, generally designated 37, is screwed into the port 31 and abuts the seat 33 to block flow out the port. The filler plug 37 includes a central relief passage 41 which is blocked by a meltable insert 43 and a series of radially outwardly and axially inwardly flaring filler passages 47. Thus, the plug 37 can be backed a fraction of a turn away from the seat 33 and a charging fitting (not shown) attached thereto to introduce a charging fluid to the passage 13. When the plug 37 is seated against the seat 33, and the temperature around the valve V increases to the melting temperature of the insert 43, the insert will melt releasing the fluid in the container to which the valve V is attached.

With continued reference to FIG. 2, the valve V includes a housing, generally designated 51, which has a central threaded bore 53 in its lower end. A reduced bore 55 defines the mid-portion of the passage 13 and the upper side of the housing 51 includes a threaded bore 57 similar to the bore 53. A diaphragm seat 61 is disposed at the inner end of the bore 53 and includes an upwardly-facing annular groove which receives an O-ring 63. The diaphragm 21 is pressed against the diaphragm seat 61 by a diaphragm retainer 67 which is screwed into the bore 53.

The slider 25 includes a peripheral flange 71 which forms an upwardly-facing groove 73. A coil compression spring 75 is interposed between the flange 71 and the retainer 67 for biasing the slider 25 away from the diaphragm 21. An outlet fitting, generally designated 79, is formed with an upwardly projecting annular flange 83 for interfitting an annular recess 85 formed at the lower extremity of the housing 51. The outlet fitting 79 includes a central bore 89 extending inwardly from its upper end for receiving the slider flange 71. A reduced bore 91 receives the lower extremity of the slider 25 and the lower portion of the bore 91 is stepped for receiving the connecting fitting of a discharge attachment 93 (FIG.

7). The upper face of the fitting 79 is formed with an annular groove for receiving an O-ring 95.

Figure 7:
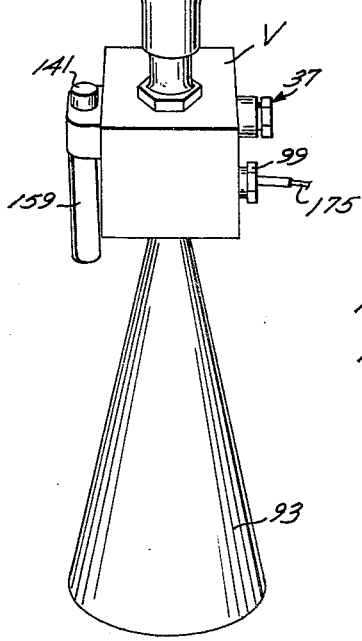
FIG. 7 is a perspective view, in reduced scale, of the valve shown in FIG. 1 installed on a fire extinguisher.

Referring to FIG. 1, the fitting 79 is attached to the housing 51 by four studs 97 which slide through bores formed in the fitting 79 and screw into threaded bores in the housing 51. With continued reference to FIG. 2, the outlet fitting 79 includes a threaded bore in its right-hand side for receiving a conventional explosive squib 99, the inner end of which squib is disposed adjacent the underside of the slider flange 71 for creating a force thereagainst, upon explosion of the squib, to drive the slider 25 upwardly to cut a hole in the diaphragm 21. An inlet nipple 100 is screwed into the threaded bore 57 at the upper end of the passage 13 for attachment to a container, such as a fire extinguisher (FIG. 7).

Referring to FIGS. 2 and 3, a bypass passage 101 extends transversely from the passage 13 and an orifice 103 defined by the seat 33 extends from the port 31 to join the bypass 101. The plug 37 is reduced in diameter at 107 and has a washer-shaped copper seat 109 pressed between its inner end and the seat 33. It is of particular importance that the filler passages 47 have their inner ends 111 disposed radially outwardly of the seat 33 whereby flow from the passage 13 is blocked when the plug is seated on the seat 33. The shank of the plug 37 is formed with a peripheral groove for receiving an O-ring 115. An axial bore 117 extends inwardly from the outer end of the plug 37 and is threaded at 119 for mating with a charging fitting (not shown). The outer extremity of the plug 37 is in the form of a hex nut for mating with a conventional wrench, which may be utilized to back the plug away from the seat 33 for filling the container to which the valve V is attached.

Figure 4:
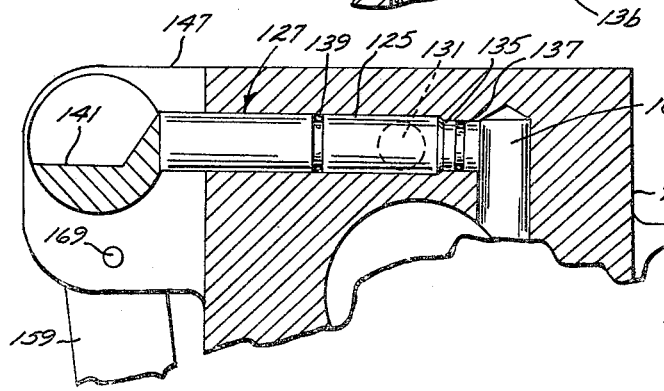
FIG. 4 is a partial horizontal sectional view, taken along the line 4—4 of FIG. 2.

Referring to FIGS. 2 and 4, the bypass bore 101 extends laterally from the passage 13 and joins with a perpendicularly extending bore 125 which receives an axially slidable piston 127. The piston 127 is normally in the position shown in FIG. 4 covering a bore 131 which extends downwardly in the housing 51 for a predetermined distance and joins with a bore that extends perpendicularly thereof to join with the passage 13 below the diaphragm 21. A series of ports 135 are formed in the wall of the slider 25 for communicating fluid from the bypass bores 101 and 131 out the outlet fitting 79. The piston 127 and bore 125 are formed with complementary reductions in diameters at 135 and the piston 127 is formed with an annular groove near its right-hand end for receiving an O-ring 137. The piston 127 is also formed at its mid-portion with an annular groove for receiving an O-ring 139 for forming a seal between the bore 125 and piston 127 to prevent flow to the left, as viewed in FIG. 4.

With continued reference to FIGS. 2 and 4, the left-hand end of the piston 127 abuts a rotatable cam 141 which has its shank 143 journaled in a vertical bore 145 formed in a projection 147 of the housing 51. The shank 143 is reduced in diameter to form a shoulder 151 and projects downwardly below the shoulder to form a stud 153. A washer 155 fits over the shank 143 and a handle 159 has a transverse bore which receives the reduced-in-diameter portion of the shank 143 and rests against the shoulder 151. A washer 161 fits over the handle 159 and a nut 163 is threaded onto the stud 153 and presses the washer against the handle 159 and the handle against the shoulder 151. Referring to FIG. 1, the handle 159 includes a bore near the nut 163 for receiving an L-shaped key 167, the projecting end of which key is received in a bore 169 (FIG. 4) formed in the housing projection 147. The key 167 is chained to a screw 171 which is screwed into a threaded bore in the housing 51.

Figure 6:
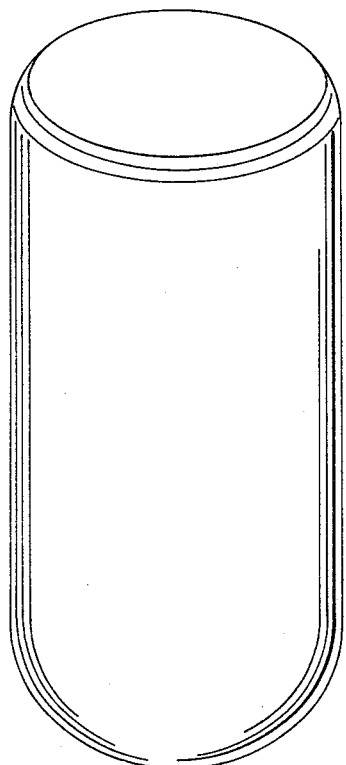
FIG. 6 is a partial horizontal sectional view, similar to FIG. 3.
Figure 6:
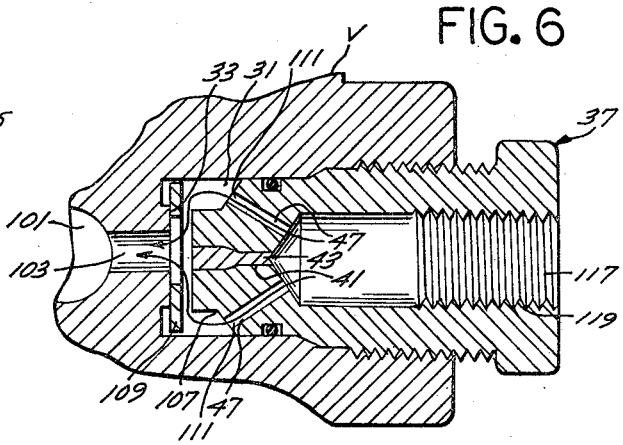

In operation, the valve V is attached to a container (not shown), such as a fire extinguisher, by the inlet fitting 100. When it is desirable to charge the fire extinguisher with extinguishing fluid, the fitting of the charging apparatus (not shown) is connected with the plug 37 via the threaded bore 117. The plug 37 is then backed away from the seat 33 and the extinguishing material is introduced through the filler passages 47 and through the orifice 103 to the passage 13, from where it will pass into the extinguisher, as shown by the directional arrows in FIG. 6. When the extinguisher is fully charged, the plug 37 is tightened against the seat 33 and the extinguisher returned to its normal location.

If it is desirable to manually release extinguishing fluid from the extinguisher, the pin 167 can be pulled from the handle 159 and the handle rotated 90 degrees from the position shown in FIG. 4 to enable the piston 127 to be moved to the left by the pressure of the extinguishing fluid uncovering the vertical bore 131 whereby extinguishing fluid will pass from the passage 13, out the bores 101 and 131, into the slider bores 135 and out the extinguisher attachment (not shown). When it is desirable to close the bypass, the handle 159 is rotated to the position shown in FIG. 4 to move the piston to the right against the pressure of the extinguishing fluid and cover the end of the bore 131.

Figure 5:
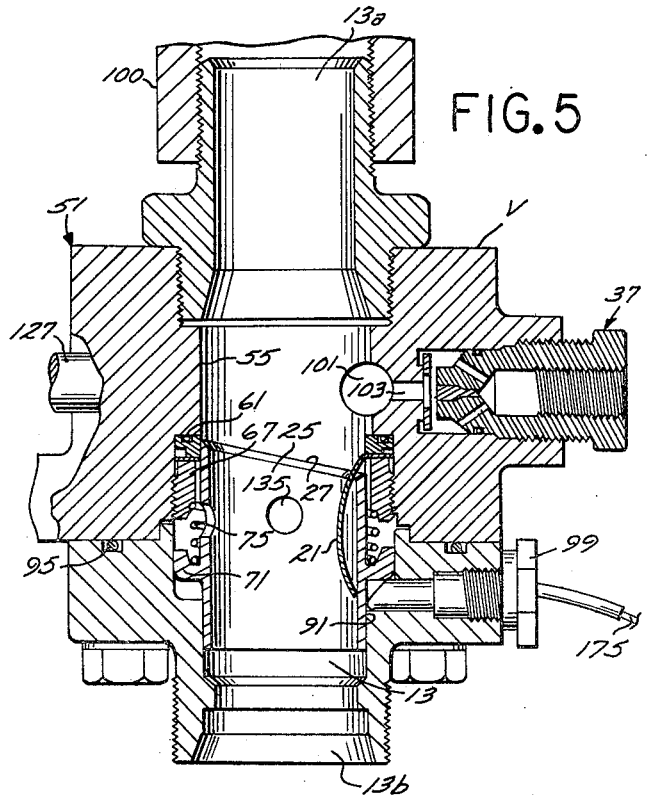
FIG. 5 is a vertical sectional view, similar to FIG. 2.

A particularly useful application of the valve V is for aircraft fire extinguishers, in which case the electrical lead 175 from the squib 99 is connected with an actuating switch on the flight engineer's control panel. When fire is detected in the aircraft, the flight engineer depresses the associated switch to generate an electrical impulse in the lead 175, firing the squib 99 and creating a rapid pressure build-up under the slider flange 71 to drive the slider upwardly, forcing the cutting edge 27 to cut a circular hole in the diaphragm 21. The cutting edge 27 is sloped to cause it to progressively pierce the diaphragm 21 thus decreasing the amount of force required to cut the diaphragm. The squib 99 preferably has insufficient energy to cause the slider 25 to entirely sever the circular cut-out from the diaphragm 21 thus leaving a portion of it fastened to the diaphragm proper whereby the cutout piece will not be blown from the valve thus avoiding the danger of a free piece of diaphragm plugging the discharge attachment. This feature is illustrated in FIG. 5 where the diaphragm 21 is shown in its pierced condition. In case of a fire in the area of a fire extinguisher, having the valve V attached thereto, which remains undetected, the meltable insert 43 will melt and release the fire extinguishing fluid before the heat becomes great enough to build the pressure in the extinguisher up enough to rupture the extinguisher. This feature avoids running the extinguisher container as well as releasing the extinguishing fluid to, perhaps, extinguish the fire.

Various modifications and changes may be made with regard to the foregoing detailed description without departing from the spirit of the invention.

I claim:
1. A discharge valve for selectively discharging fluid from a container and relieving said fluid at a predetermined temperature, said valve comprising:
   a housing formed with a passage defining an inlet and an outlet, a relief and filler port in communication with said inlet, said port being formed with internal threads and an outwardly facing valve seat defining a control orifice;
   a diaphragm interposed in said passage between said port and outlet for normally blocking flow through said passage;
   means in said passage for selectively cutting a hole in said diaphragm;
   a plug formed on its inner end to abut said valve seat to block flow from said orifice, said plug including a through relief passage having its inner end confronting said orifice, a through filler passage having its inner end offset from said orifice with flow through said filler passage being arrested upon engagement of said plug and seat, said plug further including external threads for engaging said threads in said port and coupling means for coupling a filling apparatus with said filler passage; and a meltable insert normally plugging said relief passage and meltable at said predetermined temperature to relieve pressure out said relief passage.

2. A discharge valve as set forth in claim 1 wherein: said coupling means is formed by internal threads in the outer extremity of said filler passage.

References Cited
UNITED STATES PATENTS

| | | |
|---|---|---|
| 1,750,335 | 3/1930 | Taylor. |
| 2,025,141 | 12/1935 | Werder _____ 141—18 |
| 2,417,082 | 3/1947 | Mapes et al. _____ 169—28 |
| 2,474,826 | 7/1949 | Cantlin _____ 137—68 X |
| 2,661,804 | 12/1953 | Haessler _____ 137—68 |
| 2,824,570 | 2/1958 | Silverman et al. ___ 251—216 X |
| 3,010,520 | 11/1961 | Seaberg _____ 169—31 |

WILLIAM F. O'DEA, Primary Examiner

RICHARD GERARD, Assistant Examiner

U.S. Cl. X.R.

137—74; 141—18; 169—28, 31; 222—402.16; 251—216